April 14, 1953     M. H. BARNES     2,634,554
SYNTHETIC GEM PRODUCTION
Filed Sept. 21, 1943
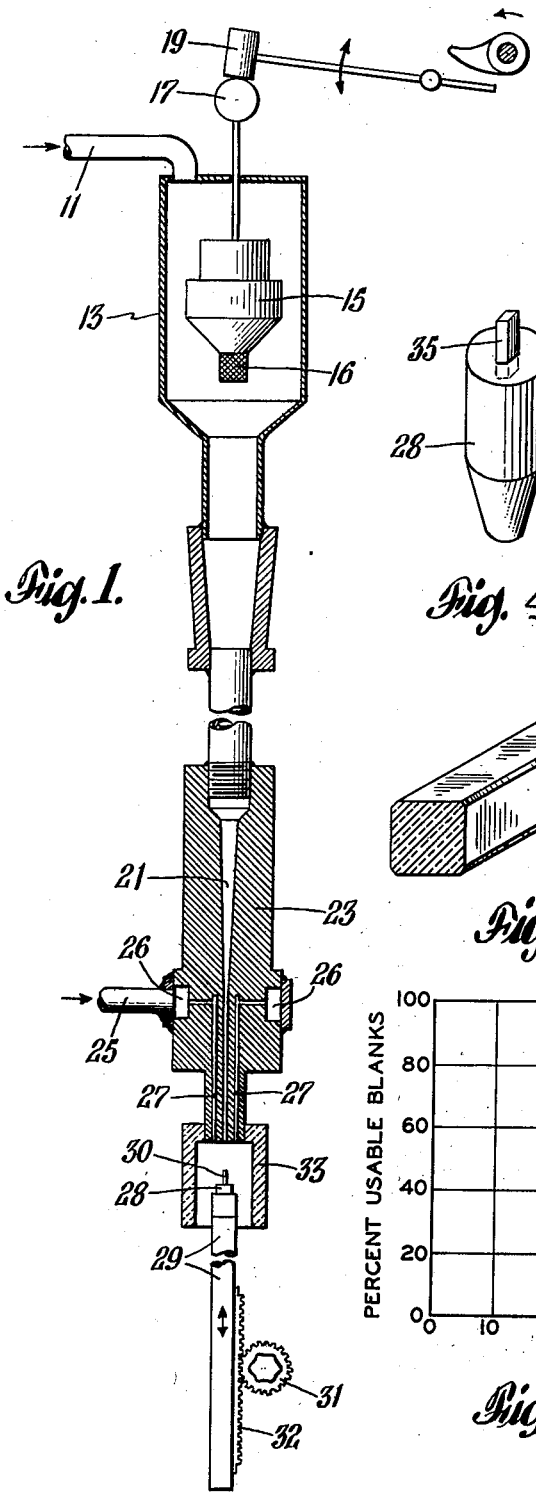
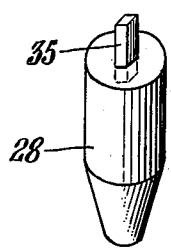
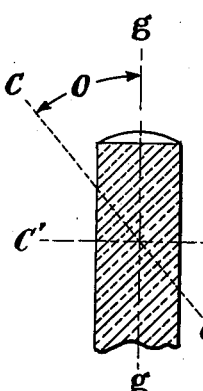
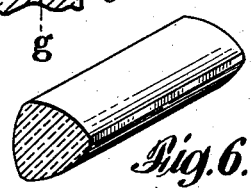
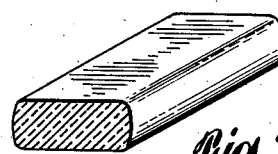
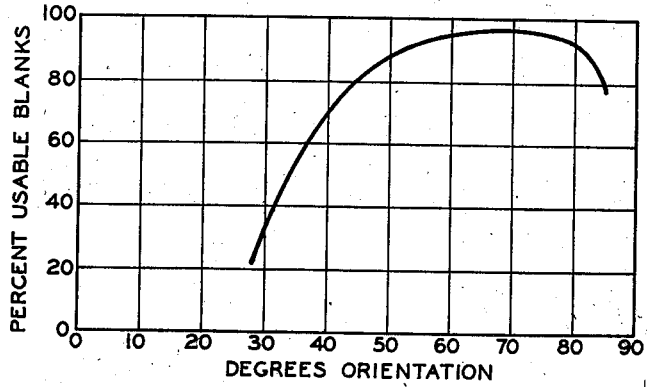
INVENTOR
MALCOLM H. BARNES
BY
ATTORNEY Patented Apr. 14, 1953

2,634,554

UNITED STATES PATENT OFFICE 2,634,554

SYNTHETIC GEM PRODUCTION

Malcolm H. Barnes, Kenmore, N. Y., assignor, by mesne assignments, to Union Carbide and Carbon Corporation, a corporation of New York Application September 21, 1943, Serial No. 503,240

3 Claims. (Cl. 49—77)

This invention relates to a process for controlling the crystallographic orientation of synthetic gem bodies made by fusing and accumulating material upon a suitable support. The invention also concerns the production of bodies of synthetic corundum and spinel having the form of thin rods.

Patent 1,004,505 to Verneuil discloses the production of short, large diameter synthetic corundum boules by fusing alumina in an oxy-hydrogen flame and accumulating the fused alumina upon a suitable support, which is gradually lowered away from the flame. Although synthetic gem boules may be made successfully by the process and apparatus of Verneuil, the crystallographic orientation of the bodies so produced is unpredictable and entirely haphazard.

An object of the present invention is the provision of a novel process for controlling the crystallographic orientation in a crystal body produced by fusing and accumulating the constituents of such a body. Another object is the provision of such a process for initially establishing in an optically uniaxial crystalline body, such as corundum, a desired orientation or angular relation between the crystallographic axes of the crystal and its direction of growth, particularly between the optic or C-axis thereof and the growth axis of the body. Still another object is the provision of such a process whereby bodies crystallizing in the isometric system, such as synthetic spinel, may be grown with a predetermined crystallographic orientation with respect to the growth axis of the body. Another object is the provision of a body of synthetic corundum in the form of a thin rod having a crystallographic orientation confined between lower and upper limits, whereby an improved yield of usable product is obtained when the rod is sawed, ground, or otherwise fabricated. Another object is to provide synthetic spinel in the form of a thin rod with and without controlled crystallographic orientation. Other objects are the provision of both clear or white sapphire rods and red or ruby rods, of controlled orientation.

The above and other objects, and the novel features of the invention, will become apparent from the following description, having reference to the accompanying drawings, wherein:

Fig. 1 is a schematic vertical sectional view, parts being in elevation, of one form of apparatus for performing the process of the invention;

Fig. 2 is an enlarged bottom end view of the burner shown in Fig. 1;

Fig. 3 is an enlarged vertical sectional view of a portion of a corundum rod;

Fig. 4 is an enlarged perspective view showing the upper end of the support for a synthetic gem body;

Figs. 5, 6, and 7 are perspective views of portions of variously oriented spinel rods made by the process of the invention; and Fig. 8 is a curve showing the relation between the orientation of corundum rod and the yield of usable jewel blanks obtained by cutting the rod.

My process for controlling the crystallographic orientation of synthetic gem bodies will be described in detail hereinafter, for illustration only, as applied to the production of long thin rods of synthetic corundum and spinel. However, it is to be understood that the principles of the process are applicable to the production of synthetic gem bodies having other forms or compositions, such as short boules of relatively large diameter.

As shown in Fig. 1 of the drawings, in one form of apparatus suitable for producing or effecting growth of synthetic gem rods by the process of the invention, oxygen is supplied through a pipe 11 to the interior of a powder dispenser 13 having therein a container 15 for powder, provided with a sieve 16. The powdered gem material, such as refractory crystallizable alumina powder or alumina-magnesia powder, is sifted from the container 15 by intermittently striking an anvil 17 with a hammer 19, and is conducted by the oxygen into the central passage 21 of a vertical burner 23 from which it is delivered downwardly as a stream of restricted cross-section containing a limited quantity of particles of the refractory material. Fuel gas, such as hydrogen, is supplied to the burner 23 through a conduit 25 opening into an annular distributing chamber 26. From the chamber 26, the fuel gas passes to the lower end of the burner through a plurality of passages 27 surrounding the central passage 21. The oxygen and hydrogen mix together outside the burner and, upon ignition, the resulting flame heats to a high temperature and melts the powdered gem material, which accumulates upon the top of a ceramic pedestal 28 carried by a vertical support 29, forming a thin rod 30 axially aligned with the burner 23. It is not known for certain whether the powder melts before or after deposition on the support.

As the synthetic gem rod 30 increases in length, it is gradually moved or withdrawn downwardly away from the burner 23 in proportion as the particles are deposited thereon by a pinion gear 31 cooperating with a rack 32 on the side of the support 29. The pinion 31 may be actuated either manually or by a suitable mechanical drive, such as an electric motor. The upper end of the growing rod is kept within a small cylindrical heat-confining casing or furnace 33, of heat-resistant metal or ceramic material, which is sleeved over the lower end of the burner 23.

Synthetic gem rods in the condition as grown with the apparatus described above are long, thin, transparent single crystals having surfaces which appear to be frosted. Continuous rods three feet long have been produced, and greater lengths are possible, depending only on the size of the apparatus. If their diameter is excessive (greater than 3/16 inch) corundum rods usually split longitudinally.

Synthetic corundum and spinel rods are advantageous as the raw material from which jewel bearing blanks may be cut. The large diameter synthetic gem boules heretofore used as a raw material for jewel blanks have given a small yield of jewel blanks because the many saw cuts involved in shaping a small blank from a large boule necessitate the removal and waste of much material. In contrast, the only saw cut usually required for shaping a jewel blank from synthetic gem rod is the initial cross cut by which the blank is sliced from the rod.

Fig. 3 illustrates the meaning of the terms used herein, by way of example only, to define the orientation of optically uniaxial crystals, such as corundum. The optic axis or C-axis, represented by the line C—C, lies in the direction in which light may be passed through the crystal without being doubly refracted. There is only one such direction in optically uniaxial crystals, and the term "orientation," when used with reference to corundum in this application only for specifically illustrating the principles of the invention, means the angle O included between the C-axis and the axis of growth, or principal axis g—g. Without orientation control, the initially grown portion of a corundum crystal has an unpredictable orientation which may be between 0 and 90 degrees. It is apparent that the orientation of such a crystal can be defined more completely by the angular relation of all of its crystallographic axes with respect to the direction of growth.

In the production of bodies of synthetic corundum such as cylindrical rods, by fusing alumina in an oxy-fuel flame, the corundum bodies, as the process of growth continues and the lengths of the bodies increase, exhibit progressively increasing values of the angle O which gradually approach an upper limit of 90 degrees. Axis C'—C' represents the direction of the optic axis when the angle O is 90°. Without orientation control, the initially grown portion of such a body has an unpredictable orientation which usually is much less than 90 degrees.

Similarly, in the production of synthetic spinel crystals or rods without orientation control, any one of a number of unpredictable crystalline orientations may be produced initially. The orientation of spinel crystals is here defined by the positions of the crystal faces and axes of symmetry relative to the principal or growth axis of the body. The three principal symmetrical orientations shown by synthetic spinel rods are the cubic, octahedral, and dodecahedral, as shown in Figs. 5, 6, and 7, respectively. Any one of these three forms, or intermediate forms, may appear in the rod. Although the orientation of a spinel rod ordinarily does not change during its growth, under some conditions there is a gradual change in orientation. For example, spinel rods grown at a rate of about one inch per hour have a comparatively stable orientation, but when the rate of growth is two inches per hour the orientation changes gradually. This is evidenced by a change in the shape of the rod, as from a generally square cross section to a rectangular cross section. The change in the angular relation between the various crystal faces and the axis of growth may be determined by X-ray methods.

I have found that I can control the crystallographic orientation of a crystal body which is produced by the fusion of its constituents in the manner described above. I initially establish in such a body a predetermined crystallographic orientation with respect to the vertical growth axis g—g by initially fusing and accumulating the constituents of the body on a support comprising a small starting piece or seed of a like crystal body, the seed being so positioned or oriented that the crystallographic orientation thereof with respect to the growth axis of the growing body is the same as the crystallographic orientation initially desired. A seed crystal 35 having the desired orientation is cut from a boule or the like, and is mounted in any suitable manner on the top of the support 29 in the proper position with its crystal axes in predetermined directions. As shown in Fig. 4, the seed 35 is embedded in a ceramic foot 28 which may be positioned on the top of the support. The top of the seed 35 is then brought to the melting point in the flame and the growing of the crystalline body is begun by admitting powdered gem material to the burner 23 from the container 15, and accumulating the fused material on the fused top of the starting crystal or seed which thus becomes an integral part of the growing body and forms a single crystal therewith.

The proper manner of cutting and positioning the seed is determined differently for different types of crystal bodies. In the case of uniaxial crystals such as corundum, the direction of the C-axis of a crystal boule or rod is determined with a polarizing microscope or X-ray machine. Then the seed is cut so that the C-axis makes the desired angle with the vertical axis of the seed, which is to coincide with the growth axis of the crystal, and the seed is positioned in the gem growing apparatus.

As mentioned previously, the angle between the growth axis and the optic or C-axis of optically uniaxial crystals, such as corundum, increases as the length of the body increases, and gradually approaches an angle of 90 degrees. I maintain the orientation, or angle between the C-axis and the growth axis, above a predetermined lower limit by seeding the rod with a seed of a like crystal body, so cut and so positioned that the orientation of the seed is the same as the desired initial orientation or angular relation in the growing body. Furthermore, I can confine the orientation over the whole length of the rod between lower and upper limits by experimentally predetermining the relation between the increasing rod length and the rate of increase of the angle between the C-axis and the growth axis. Knowing the rate of orientation change, I stop the addition of gem material and arrest the growth of a rod when its length corresponds to the desired upper limit of orientation. The long cylindrical rod then is cut off or otherwise detached from the seed substantially at the seed rod junction or at some other locality having a desired lower orientation limit, and the growth of another rod of corundum may be started using the remaining portion of the rod as a seed.

When producing rods of white sapphire (clear corundum) by the fusion of pure alumina, the rate of change of orientation with length is quite slow. However, when making ruby (red corundum) by fusing alumina combined with small amounts of a chromium compound, such as chromium oxide in an amount less than 1%, the rate of change of orientation with length is much faster than with the uncolored rod. Consequently, if it is desired to maintain the angle between the C-axis and the growth axis between lower and upper limits, a shorter length of rod within the desired orientation range can be grown with the ruby composition than with the pure alumina.

Control of the crystallographic orientation of synthetic spinel presents problems somewhat different from the control of corundum. Spinels are formed by the crystallization of a composition of two metal oxides in the ratio of 1 atomic part of metal $R_1$ to 2 atomic parts of metal $R_2$ to 4 atomic parts of oxygen, to form a characteristic cubic crystal ($O_h^7$), and include such variations from the above composition as retain the excess oxide of $R_1$ (or $R_2$), or even one or more other oxides, as a solid solution in the spinel with the characteristic cubic structure ($O_h^7$). Small quantities of coloring materials may sometimes be included. First the crystal orientation is determined, either by microscopic examination of the crystallites in the crust of the crystal body or by X-ray methods. Then a spinel seed crystal is cut from the crystal body in such a direction that an octahedral face or other desired crystallographic face, such as a cubic or dodecahedral face, is normal to the vertical axis of the seed, or is inclined at any desired angle to the vertical axis. The seed is thereafter so mounted that its vertical axis coincides with the desired growth axis, and the growth of the rod proceeds in the manner described previously herein. As with corundum, the rod may be detached from the seed substantially at the seed-rod junction and the growth of a new rod may be started using the remaining portion of the rod as a seed. Rods having orientations between the three principal symmetrical orientations can be grown by inclining the seeds or cutting them in different directions. Although the crystallographic orientation of other spinel compositions as defined above may be controlled in the same manner, spinel rods and boules wherein the orientation is controlled by the process of the invention were principally made from a powdered material consisting of a composition of alumina and magnesia. The composition may comprise between 8% and 28% magnesia, the balance being substantially all alumina, it being understood that small quantities of coloring material may also be used.

When growing spinel rod under conditions such that the orientation changes gradually during growth, the orientation in a rod may be maintained between certain initial and final limits throughout its length by first predetermining the rate of orientation change as the length of the rod increases. Then the spinel powder is initially fused and accumulated on a seed so positioned that its orientation with respect to the growth axis equals the initial limit. The growth of the rod is continued until its length corresponds to the desired final limit of orientation, when growth is discontinued and the rod is detached from the seed or is cut off at some other locality having a desired initial orientation limit.

A high degree of roundness and good mechanical strength are present in spinel rods containing crystal twins. A compound crystal, which is composed of two or more crystals, or parts of crystals, which are arranged according to some definite law is designated as a twin crystal, as distinguished from multi-crystalline forms or crystal aggregates in which the component crystals are randomly oriented. When twinning is repeated in parallel, it is called lamellar or polysynthetic. I have found that in rods grown from seeds containing many lamellar vertical twins, similar twinning is induced and the rods grow somewhat rounder than the truly single-crystal spinel rods. This is an advantage when the rods are to be turned to a uniform diameter in a centerless grinder, because less material must be removed to obtain a true cylinder.

I have found that there exists an important correlation between the crystallographic orientation of corundum rods and the results obtained in fabricating these rods to form jewel bearing blanks and other articles. When fabricating corundum rods, either clear or colored, by applying pressure transversely of the axis of the rod, as in sawing or centerless grinding, high yields of usable blanks are obtained from rods wherein the angles between the C-axes and the growth axes are between certain lower and upper limits at any point along substantially the full length of the rod, whereas poor yields are obtained outside of these limits. For example, when sawing and grinding corundum rods having crystalline orientations such that the angle between the C-axis and the growth axis lies between 30 degrees and 80 degrees, a good yield of usable jewel blanks is obtained, and breaking, splitting, and cracking are reduced to a minimum. When the orientation is below 30 degrees, however, the rods usually split longitudinally during fabrication. In fact, when the orientation is below 30 degrees, corundum rods frequently split spontaneously before any attempt at fabrication has been made. When the orientation is above 80 degrees, many notches are formed on the side of the rod during its growth. These notched rods require a large amount of grinding to eliminate the notches. Furthermore, during the grinding of notched rods, lateral cracking is frequently encountered. To obtain corundum rods having the desired orientations it is only necessary to seed the rod with a seed so positioned that its C-axis forms an angle of not less than 30 degrees and not greater than 80 degrees with the growth axis, according to the procedure described in detail previously herein.

When corundum rods contain a small amount of a material other than alumina, an oxide of chromium for example, the yield of usable jewel blanks obtained by grinding and cutting the rods usually varies to some extent from the yield obtained with white sapphire rod (pure alumina). That is to say, within the broad range of 30 degrees to 80 degrees for corundum, there usually is a narrower preferred range within which the corundum rod of modified composition gives the best results.

The critical nature of the effect of orientation on the fabrication of corundum rod is graphically illustrated in Fig. 8 of the drawings, in which the precent of usable jewel blanks cut from corundum rod is plotted against orientation. The synthetic corundum rod upon which the curve of Fig. 8 is based was white sapphire, made from pure alumina. Of course, the actual results of cutting at some orientations were slightly above or below the curve of Fig. 8, which represents a fair average of the results obtained. As shown by this curve, best results are obtained with corundum rod oriented between 30° and 80°, and preferably between 40° and 80°.

Reference is made to my Patent 2,487,091 which claims the cutting of corundum rod in accordance with the foregoing principles.

I claim:

1. In a process for growing a new single crystal of synthetic corundum along an axis of growth by intermittently passing powdered alumina through a flame and fusing and building up said alumina by crystallization on a suitable support aligned axially with said flame while gradually moving said flame and support apart axially to solidify said alumina progressively and form an axially lengthening crystal on said support, the improvement which comprises: determining the relation between the increase of the C-axis orientation of an identical crystal and the increase in length of such identical crystal; maintaining the C-axis orientation above a lower limit throughout the length of such new crystal by initially fusing and accumulating said alumina on a support comprising a partially fused corundum seed crystal so positioned that the C-axis orientation thereof with respect to said axis of growth equals such lower limit, said seed thereby becoming an integral part of said new crystal; increasing the length of such new crystal by continuing to fuse and build up alumina thereon while gradually moving said support and flame apart axially; and discontinuing the growth of such new crystal when the length thereof corresponds to the desired upper limit of C-axis orientation.

2. A process for growing along an axis of growth a single crystal of synthetic corundum in the shape of a long thin rod which process comprises providing a corundum seed crystal; positioning said seed crystal so that the C-axis thereof is oriented at an angle of not less than 30 degrees and not greater than 80 degrees relatively to said axis of growth; partially fusing said seed crystal in a flame aligned therewith on said axis of growth; and intermittently passing powdered alumina through said flame and fusing and building up said alumina by crystallization on the fused part of said seed crystal as a support while gradually moving said seed crystal and said flame apart along said axis of growth, thereby solidifying said alumina progressively and forming an axially lengthening rod crystal integral with said seed crystal and initially having the same C-axis orientation as said seed crystal with respect to said axis of growth.

3. The method of preparing a rod of synthetic corundum, which comprises orienting a starting crystal of corundum so that the C-axis thereof is at an angle between 30 degrees and 80 degrees to the intended axis of growth of the rod, delivering a stream of restricted cross-section containing a limited quantity of molten particles of aluminum oxide at high temperature downwardly upon the starting crystal, and withdrawing the crystal downwardly in proportion as the particles are deposited thereon, whereby to effect growth of a rod forming a single crystal with said starting crystal.

MALCOLM H. BARNES.

References Cited in the file of this patent

UNITED STATES PATENTS

| Number | Name | Date |
| --- | --- | --- |
| Re. 19,698 | Kjellgren | Sept. 10, 1935 |
| 988,230 | Verneuil | Mar. 28, 1911 |
| 1,298,540 | Miller | Mar. 25, 1919 |
| 1,580,199 | Hering | Apr. 13, 1926 |
| 1,775,869 | Sandmeier | Sept. 16, 1930 |
| 1,775,870 | Sandmeier | Sept. 16, 1930 |
| 1,793,672 | Bridgman | Feb. 24, 1931 |
| 2,104,949 | Marks | Jan. 11, 1938 |
| 2,214,976 | Stockbarger | Sept. 17, 1940 |

FOREIGN PATENTS

| Number | Country | Date |
| --- | --- | --- |
| 243,251 | Great Britain | Nov. 26, 1925 |
| 662,782 | France | Mar. 5, 1929 |
| 509,132 | Germany | Oct. 4, 1930 |

OTHER REFERENCES

Phillips, "Mineralogy," pages 342, 343, 371, and 372.

"Endeavor," 1943, vol. 2, #7, pages 99 to 104, The Chemistry of Gemstones, W. T. Gordon.